United States Patent
Kim et al.

(10) Patent No.: US 10,377,926 B2
(45) Date of Patent: Aug. 13, 2019

(54) ADHESIVE FILM, ADHESIVE COMPOSITION FOR THE SAME, AND DISPLAY MEMBER INCLUDING THE SAME

(71) Applicant: CHEIL INDUSTRIES INC., Gumi-Si, Gyeongsangbuk-do (KR)

(72) Inventors: Ki Yong Kim, Uiwang-si (KR); Ik Hwan Cho, Uiwang-si (KR); Lee June Kim, Uiwang-si (KR); Chan Woo Kim, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 752 days.

(21) Appl. No.: 14/051,371

(22) Filed: Oct. 10, 2013

(65) Prior Publication Data

US 2014/0099495 A1 Apr. 10, 2014

(30) Foreign Application Priority Data

Oct. 10, 2012 (KR) .......................... 10-2012-0112684
Mar. 8, 2013 (KR) .......................... 10-2013-0025318

(51) Int. Cl.
| | | |
|---|---|---|
| *C09J 133/08* | (2006.01) | |
| *C09J 7/00* | (2018.01) | |
| *C08L 33/14* | (2006.01) | |
| *C09J 7/38* | (2018.01) | |

(Continued)

(52) U.S. Cl.
CPC ............ *C09J 133/08* (2013.01); *C08L 33/14* (2013.01); *C09J 7/00* (2013.01); *C09J 7/22* (2018.01); *C09J 7/38* (2018.01); *C09J 2201/622* (2013.01); *C09J 2203/318* (2013.01); *C09J 2433/00* (2013.01); *G02B 5/3025* (2013.01); *Y10T 428/2878* (2015.01)

(58) Field of Classification Search
CPC .......................... C09J 133/08; C09J 2201/622
See application file for complete search history.

(56) References Cited

U.S. PATENT DOCUMENTS

| | | | | |
|---|---|---|---|---|
| 2004/0091729 A1* | 5/2004 | Olson | ................... | C08F 220/18 428/523 |
| 2008/0145572 A1* | 6/2008 | Yano | ..................... | C09J 7/0217 428/1.54 |

(Continued)

FOREIGN PATENT DOCUMENTS

| | | |
|---|---|---|
| CN | 101508875 A | 8/2009 |
| CN | 10210995 A | 6/2011 |

(Continued)

OTHER PUBLICATIONS

SIPO Office action dated Sep. 29, 2014 in Chinese application No. 201310471334.2 with English translation (18 pages).

*Primary Examiner* — Scott R. Walshon
*Assistant Examiner* — Jasper Saberi
(74) *Attorney, Agent, or Firm* — Lewis Roca Rothgerber Christie LLP

(57) ABSTRACT

An adhesive film includes a cured product of a (meth)acrylic copolymer and has a refractive index from about 1.5 to about 1.6. An adhesive composition for preparing the adhesive film includes a (meth)acrylic copolymer of a monomer mixture. A display member includes the adhesive film coated on one or more surfaces of an optical film.

14 Claims, 1 Drawing Sheet

(51) Int. Cl.
*C09J 7/22* (2018.01)
*G02B 5/30* (2006.01)

(56) References Cited

U.S. PATENT DOCUMENTS

| | | | |
|---|---|---|---|
| 2010/0240831 A1* | 9/2010 | Kim | C08F 220/06 |
| | | | 524/878 |
| 2011/0143135 A1* | 6/2011 | Jeong | C09J 7/0217 |
| | | | 428/355 AC |
| 2012/0172480 A1* | 7/2012 | Kim | C08F 222/20 |
| | | | 522/77 |
| 2012/0214936 A1* | 8/2012 | Fujita | C09J 7/0246 |
| | | | 524/548 |
| 2013/0005928 A1* | 1/2013 | Hoshino et al. | C09J 133/064 |
| | | | 526/329.7 |
| 2013/0011658 A1* | 1/2013 | Okamoto | B32B 27/08 |
| | | | 428/317.3 |

FOREIGN PATENT DOCUMENTS

| | | |
|---|---|---|
| JP | 2012-021148 A | 2/2012 |
| KR | 10-2012-0105557 A | 9/2012 |
| TW | 201134905 A1 | 10/2011 |
| TW | 201139601 A1 | 11/2011 |
| WO | WO 2012/018934 A1 | 2/2012 |

\* cited by examiner

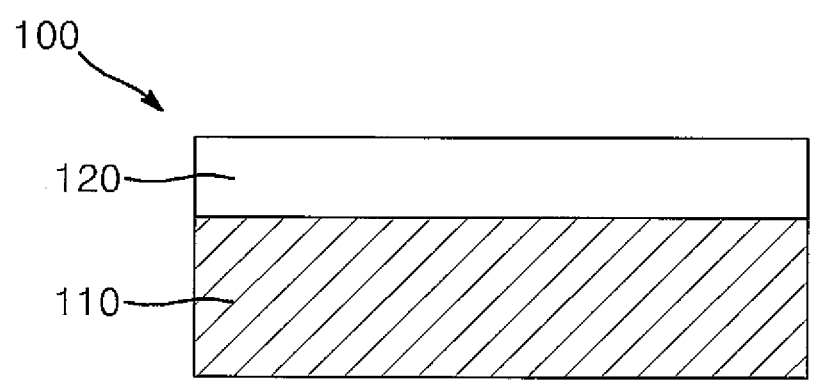

ADHESIVE FILM, ADHESIVE COMPOSITION FOR THE SAME, AND DISPLAY MEMBER INCLUDING THE SAME

CROSS-REFERENCE TO RELATED APPLICATIONS

This application claims priority to and the benefit of Korean Patent Application No. 10-2012-0112684, filed on Oct. 10, 2012, and Korean Patent Application No. 10-2013-0025318 filed on Mar. 8, 2013, in the Korean Intellectual Property Office, the entire contents of both of which are incorporated herein by reference.

BACKGROUND

1. Technical Field

Embodiments of the present invention relate to an adhesive film, an adhesive composition for the same, and a display member including the same.

2. Description of the Related Art

A capacitive touch pad senses variation in capacitance on a window or film attached to an upper side thereof via a transparent adhesive film. The window may be formed of glass, PMMA, PC, or the like. Depending on the kind of window materials, the capacitive touch panel may suffer from various problems, such as detachment, bubbling, warpage, ITO pattern exposure, and the like, upon change of environmental conditions. Moreover, ITO alternatives, such as CNTs, Ag nanowires, graphene, and the like, can cause pattern visibility due to differences in the index of refraction. Particularly, Ag nanowires and CNTs cause problems of pattern visibility due to differences in the index of refraction in the course of preparation of a touch panel module.

In polymerization of (meth)acrylic copolymers used in the preparation of existing OCA films, the (meth)acrylic copolymers may exhibit yellowing and slow reaction rates when a monomer has an aromatic group in existing solution polymerization.

Existing adhesive compositions do not adequately solve the problem of pattern visibility, and instead impart increased indices of refraction.

SUMMARY

According to an embodiment of the present invention, an adhesive film has a high refractive index.

According to some aspects of embodiments of the present invention, an adhesive film having a high refractive index prevents or reduces pattern visibility. According to further aspects of embodiments of the present invention, the adhesive film, has good durability, is resistant to peeling, and/or avoids (or substantially avoids) yellowing (i.e., the adhesive film is less prone to the appearance of yellowing).

One aspect of the present invention relates to an adhesive film which includes a cured product of an adhesive composition comprising a (meth)acrylic copolymer and has a refractive index from about 1.5 to about 1.6.

Another aspect of the present invention relates to an adhesive composition which includes a (meth)acrylic copolymer of a monomer mixture including about 20 wt % or more of a monomer having at least two aromatic groups.

A further aspect of the present invention relates to a display member including the adhesive film.

BRIEF DESCRIPTION OF THE DRAWING

The accompanying drawing, together with the specification, illustrate embodiments of the present invention, and, together with the description, serve to explain the principles of the present invention. The drawing is a schematic cross-sectional view of a display member according to one embodiment of the present invention.

DETAILED DESCRIPTION

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements therebetween. Further, the use of "may" when describing embodiments of the present invention refers to "one or more embodiments of the present invention." Expressions such as "at least one of," when preceding a list of elements, modify the entire list of elements and do not modify the individual elements of the list. Like reference numerals designate like elements throughout the specification.

As used herein, the term "(meth)acrylate," in describing monomers and related polymers, includes both an acrylate and a methacrylate, and the term "(meth)acrylic" includes both acrylic and methacrylic.

As used herein, the term "copolymer" may be used to refer to oligomers or polymers.

As used herein, the term "substituted," for example, in the phrase "substituted or unsubstituted group" refers to the substitution of at least one hydrogen atom in the group with a substituent other than hydrogen, e.g., a functional group. Non-limiting examples of the substituent include a halogen (F, Cl, Br or I), a hydroxyl group, a nitro group, a cyano group, a carboxylic acid group, a $C_1$ to $C_{20}$ alkyl group, a $C_6$ to $C_{30}$ aryl group, a $C_3$ to $C_{30}$ cycloalkyl group, a $C_3$ to $C_{30}$ heteroaryl group, and a $C_2$ to $C_{30}$ heterocycloalkyl group.

According to an embodiment of the present invention, an adhesive film includes a cured reaction product of an adhesive composition comprising a (meth)acrylic copolymer of a mixture of monomers. The adhesive film may have a refractive index of about 1.5 or more. For example, the adhesive film may have a refractive index of about 1.5 to about 1.6, about 1.51 to about 1.53, about 1.51, about 1.52, or about 1.53.

In some embodiments, the adhesive film is an optical clear adhesive (OCA) film. The adhesive film may be used, for example, for attaching a window or film composed of glass, polymethyl methacrylate (PMMA) or propylene carbonate (PC) to a touch panel.

In some embodiments, the adhesive film is an OCA film having a higher refractive index than commonly used OCA films. Accordingly, in some embodiments, the adhesive film has high (or improved) pattern concealment, and may thus improve pattern visibility of a transparent electrode film.

The refractive index of a film (e.g., an adhesive film) may be measured by any suitable and/or commonly used method. For example, the refractive index of an adhesive film having a thickness of about 10 μm to about 2 mm may be measured in accordance with ASTM D1218.

In some embodiments, the adhesive film has an average dielectric constant of less than about 3. In these embodiments, the adhesive film may prevent or reduce pattern visibility. For example, the adhesive film may have an average dielectric constant of about 2.8 to about 2.9, for example about 2.80, about 2.81, about 2.82, about 2.83, about 2.84, about 2.85, about 2.86, about 2.87, about 2.88, about 2.89 or about 2.9.

The adhesive film may be used, for example, as an OCA film or a touch panel film.

In some embodiments, the adhesive film has a thickness (not including a thickness of a release film) of about 10 μm to about 2 mm or about 100 μm to about 1.5 mm. However, the thickness of the adhesive film is not limited to these embodiments.

The adhesive film may include a cured reaction product of an adhesive composition comprising the (meth)acrylic copolymer. For example, the cured reaction product of the adhesive composition comprises cross-linked (meth)acrylic copolymers.

In one embodiment, the adhesive film may be prepared by coating the adhesive composition onto a release film (for example, a polyester film such as a polyethylene terephthalate film) and UV curing the coated release film.

In one embodiment, the UV curing may be performed at about 50 mW/cm$^2$ or less for about 6 minutes or less. The UV curing may be performed in an oxygen-free or substantially oxygen-free atmosphere. The adhesive composition may be coated (e.g., on the release film) to a thickness of about 50 μm to about 2 mm or about 50 μm to about 1.5 mm, but embodiments are not limited to these coating thicknesses.

The adhesive composition is now described in more detail.

According to some embodiments, the (meth)acrylic copolymer of the adhesive composition is a (meth)acrylic copolymer of a monomer mixture. In some embodiments, the monomer mixture includes about 20 wt % or more of a monomer having at least two aromatic groups, based on a total weight of the (meth)acrylic copolymer.

The (meth)acrylic copolymer may include about 10 wt % or more (e.g., about 15 wt % to about 35 wt %) of a functional group represented by Formula 1, based on a total weight of the (meth)acrylic copolymer.

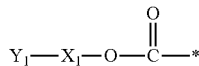

Formula 1

In Formula 1, $Y_1$ is a $C_6$ to $C_{20}$ aryl group substituted by at least one of a substituted or unsubstituted phenoxy group, a substituted or unsubstituted $C_6$ to $C_{20}$ aryl group, or a substituted or unsubstituted $C_7$ to $C_{21}$ arylalkyl group.

$X_1$ is a substituted or unsubstituted $C_1$ to $C_{10}$ aliphatic hydrocarbon group or a substituted or unsubstituted —R—$(CH_2)_n$— (where R is O, S, NH, or NR' (where R' is hydrogen or a $C_1$ to $C_5$ alkyl group), and n is an integer from 1 to 10).

* is a binding site to the polymer backbone.

The $C_1$ to $C_{10}$ aliphatic hydrocarbon group may be a linear or branched $C_1$ to $C_{10}$ alkylene or alkyl group (i.e., a monovalent or divalent alkyl group).

The (meth)acrylic copolymer may include at least one of an alkyl group, a hydroxyl group, an alicyclic group, or a carboxylic acid group, in addition to the functional group represented by Formula 1.

(Meth)Acrylic Copolymer

The (meth)acrylic copolymer may be a copolymer of a monomer mixture which includes a (meth)acrylate monomer having a $C_1$ to $C_{20}$ alkyl group, a (meth)acrylate monomer having an alicyclic group, a monomer having a hydroxy group, and a monomer having at least two aromatic groups. The monomer mixture may further include a monomer having a carboxylic acid group.

The (meth)acrylate having a $C_1$ to $C_{20}$ alkyl group may include a (meth)acrylic acid ester having a linear or branched $C_1$ to $C_{20}$ alkyl group. Non-limiting examples of the (meth)acrylate having a $C_1$ to $C_{20}$ alkyl group include methyl (meth)acrylate, ethyl (meth)acrylate, propyl (meth)acrylate, butyl (meth)acrylate, pentyl (meth)acrylate, hexyl (meth)acrylate, ethylhexyl(meth)acrylate, heptyl(meth)acrylate, octyl (meth)acrylate, nonyl (meth)acrylate, decyl(meth)acrylate, undecyl(meth)acrylate, dodecyl (meth)acrylate, and combinations thereof.

In some embodiments, the (meth)acrylate having a $C_1$ to $C_{20}$ alkyl group is present in an amount of about 10 wt % to about 50 wt %, based on a total weight of the monomer mixture or the (meth)acrylic copolymer. In these embodiments, the adhesive film may have reduced or no bubbling and/or detachment under high heat and high moisture conditions, and may thus be durable. In some embodiments, the (meth)acrylate having a $C_1$ to $C_{20}$ alkyl group may be present in an amount of about 15 wt % to about 50 wt %, about 45 wt % to about 50 wt % about 45 wt %, about 46 wt %, about 47 wt %, about 48 wt %, about 49 wt %, or about 50 wt %, each based on a total weight of the monomer mixture or the (meth)acrylic copolymer.

In some embodiments, the (meth)acrylate having an alicyclic group may include a (meth)acrylate comprising a $C_3$ to $C_{20}$ alicyclic group. Non-limiting examples of the (meth)acrylate having an alicyclic group include isobornyl(meth)acrylate, cyclohexyl(meth)acrylate, cyclopentyl(meth)acrylate, and combinations thereof.

In some embodiments, the (meth)acrylate having an alicyclic group is present in an amount of about 1 wt % to about 30 wt % based on a total weight of the monomer mixture or the (meth)acrylic copolymer. In these embodiments, the adhesive film may have improved properties in terms of heat resistance, durability, and adhesion. For example, the (meth)acrylate having an alicyclic group may be present in an amount of about 1 wt % to about 15 wt %, for example about 5 wt % to about 10 wt %, for example about 5 wt %, 6 wt %, 7 wt %, 8 wt %, 9 wt %, or 10 wt %, each based on based on a total weight of the monomer mixture or the (meth)acrylic copolymer.

Non-limiting examples of the monomer having a hydroxy group include (meth)acrylate including a $C_1$ to $C_{20}$ alkyl group having a hydroxy group or a $C_5$ to $C_{20}$ cycloalkyl group having a hydroxy group, such as 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 3-chloro-2-hydroxypropyl (meth)acrylate, diethyleneglycol mono(meth)acrylate, and the like; and $C_1$ to $C_{10}$ unsaturated alcohols such as allyl alcohol, and the like. A single monomer having a hydroxy group may be used or a combination thereof may be used.

In some embodiments, the monomer having a hydroxy group may be present in an amount of about 10 wt % to about 30 wt % based on a total weight of the monomer mixture or the (meth)acrylic copolymer. In these embodiments, the adhesive film may have improved adhesion and durability, and may avoid or reduce bubbling under moisture resistant conditions. The monomer having a hydroxy group may be present in an amount of about 15 wt % to about 25 wt %, for example about 19 wt % to about 20 wt %.

According to some embodiments, the monomer having at least two aromatic groups may have a refractive index of about 1.50 or more, for example, about 1.50 to about 1.60. In these embodiments, the adhesive film prepared using the adhesion composition may have a high refractive index.

The monomer having at least two aromatic groups may have two or more aromatic groups, for example, two to five aromatic groups. The monomer having at least two aromatic groups may include a monomer including a fused aromatic ring system as the two or more aromatic groups (e.g., a naphthalene group, or an aromatic group containing two fused rings).

Non-limiting examples of the monomer having at least two aromatic groups include monomers represented by Formula 2, fluorene-based monomers, naphthalene-based monomers, urethane-based monomers having at least two aromatic groups, sulfur-based monomers having at least two aromatic groups, and mixtures thereof:

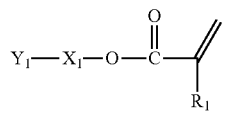

Formula 2

In Formula 2, $Y_1$ is a $C_6$ to $C_{20}$ aryl group substituted by at least one of a substituted or unsubstituted phenoxy group, a substituted or unsubstituted $C_6$ to $C_{20}$ aryl group, or a substituted or unsubstituted $C_7$ to $C_{21}$ arylalkyl group.

$X_1$ is a substituted or unsubstituted $C_1$ to $C_{10}$ aliphatic hydrocarbon group or a substituted or unsubstituted —R—$(CH_2)_n$— (where R is O, S, NH, or NR' (where R' is hydrogen or a $C_1$ to $C_5$ alkyl group), and n is an integer from 1 to 10).

$R_1$ is hydrogen or a substituted or unsubstituted $C_1$ to $C_5$ alkyl group.

In one embodiment, the monomer represented by Formula 2 may be a monomer represented by Formula 2-1:

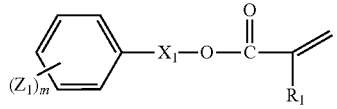

Formula 2-1

In Formula 2-1, $Z_1$ may be a substituted or unsubstituted phenoxy group, a substituted or unsubstituted $C_6$ to $C_{20}$ aryl group, or a substituted or unsubstituted $C_7$ to $C_{21}$ arylalkyl group. m may be an integer of 1 to 5. In Formula 2-1, $X_1$ may be a substituted or unsubstituted $C_1$ to $C_{10}$ aliphatic hydrocarbon group or a substituted or unsubstituted group represented by —R—$(CH_2)_n$—, in which R may be O, S, NH, or NR', with R' being hydrogen or a $C_1$ to $C_5$ alkyl group, and n is an integer of 1 to 10. In Formula 2-1, $R_1$ may be hydrogen or a substituted or unsubstituted $C_1$ to $C_5$ alkyl group.

In Formula 2, "—$(CH_2)_n$—" in —R—$(CH_2)_n$— of $X_1$ may be linear or branched.

In Formula 2, "—R—" in —R—$(CH_2)_n$— of $X_1$ is bonded to "$Y_1$—" of Formula 2.

In some embodiments, $Z_1$ is a substituted or unsubstituted phenoxy group, or a substituted or unsubstituted $C_6$ to $C_{20}$ aryl group.

In some embodiments, $X_1$ is a substituted or unsubstituted $C_1$ to $C_5$ alkylene group or a substituted or unsubstituted —R—$(CH_2)_n$— (where R is O, S, NH, or NR' (where R' is hydrogen or a $C_1$ to $C_5$ alkyl group), and n is an integer of 1 to 5).

In one embodiment, the monomer represented by Formula 2 may be phenoxybenzyl acrylate (represented by Formula 2a), phenylphenoxyethyl acrylate (represented by Formula 2b), or a mixture thereof.

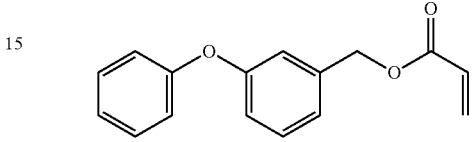

Formula 2a

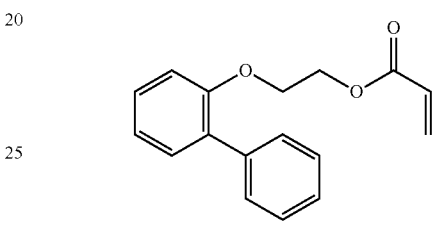

Formula 2b

Non-limiting examples of the fluorene-based monomer include monomers represented by Formula 3 and monomers derived from a compound represented by Formula 4.

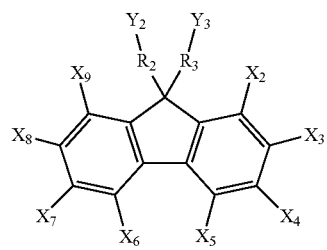

Formula 3

In Formula 3, $Y_2$ and $Y_3$ may each independently be an acrylate group, a methacrylate group, an epoxy group, or an isocyanate group. $R_2$ and $R_3$ may each independently be a substituted or unsubstituted $C_1$ to $C_{10}$ alkylene group, a substituted or unsubstituted $C_2$ to $C_{10}$ alkenylene group, a substituted or unsubstituted $C_2$ to $C_{10}$ alkynylene group, a substituted or unsubstituted $C_6$ to $C_{20}$ arylene group, a substituted or unsubstituted $C_1$ to $C_{10}$ heteroalkylene group, or a substituted or unsubstituted $C_5$ to $C_{20}$ heteroarylene group. $X_2$, $X_3$, $X_4$, $X_5$, $X_6$, $X_7$, $X_8$ and $X_9$ are the same or different and may each independently be hydrogen, a halogen, a substituted or unsubstituted $C_1$ to $C_{10}$ alkyl group, a substituted or unsubstituted $C_2$ to $C_{10}$ alkenyl group, a substituted or unsubstituted $C_2$ to $C_{10}$ alkynyl group, a substituted or unsubstituted $C_6$ to $C_{20}$ aryl group, a substituted or unsubstituted $C_1$ to $C_{10}$ alkoxy group, a substituted or unsubstituted $C_1$ to $C_{10}$ heteroalkyl group, a substituted or unsubstituted $C_7$ to $C_{20}$ arylalkyl group, or a substituted or unsubstituted amine group. At least one of $Y_2$ and $Y_3$ may be an acrylate group, or a methacrylate group.

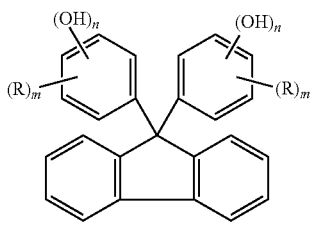

Formula 4

In Formula 4, each R may independently be a $C_1$ to $C_{10}$ alkyl group, a $C_1$ to $C_{10}$ alkoxy group, a $C_6$ to $C_{20}$ aryl group, or $C_5$ to $C_{20}$ cycloalkyl group. m may be an integer of 0 to 4. n may be an integer of 1 to 5.

Non-limiting examples of monomers derived from a compound represented by Formula 4 include fluorene-based monomers having an acrylate or a methacrylate, which may be prepared by esterification of the compound represented by Formula 4 with a monofunctional acrylic acid or methacrylic acid.

Further, the fluorene-based monomer may be a derivative prepared by esterification of bisphenol-FLA, bisphenol-FL, fluorenone, 2,7-dibromofluorenone, fluorene-9-bisphenol, or 2-iodo-9,9-dimethylfluorene with a monofunctional acrylate or a monofunctionalmethacrylate (or acrylic acid or methacrylic acid).

Non-limiting examples of the naphthalene-based monomer include derivatives prepared by esterification of hydroxyl group-substituted naphthalene with a monofunctional acrylate or methacrylate (or acrylic acid or methacrylic acid).

Non-limiting examples of the urethane-based monomer include derivatives prepared by reacting a polyol (such as glycols and polyester polyols) with a bisphenol A or bisphenol F type diisocyanate to provide a urethane oligomer, and substituting a terminal group of the oligomer with an acryl group.

Non-limiting examples of the sulfur-based monomer include derivatives prepared by esterification of a naphthalenethiol with a monofunctional acrylate or monofunctional methacrylate (or acrylic acid or methacrylic acid).

In some embodiments, the monomer having at least two aromatic groups may be present in an amount of about 20 wt % or more, based on a total weight of the monomer mixture or the (meth)acrylic copolymer. In these embodiments, the adhesive film may have an increased refractive index, may have improved pattern visibility (e.g., in reliability testing), and/or may have a reduced dielectric constant. For example, the monomer having at least two aromatic groups may be present in an amount of about 20 wt % to about 50 wt %, about 20 wt % to about 35 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt %, each based on a total weight of the monomer mixture or the (meth)acrylic copolymer.

Non-limiting examples of the monomer having a carboxylic acid group include (meth)acrylic acid, itaconic acid, maleic acid, fumaric acid, and combinations thereof. A single monomer having a carboxylic acid group may be used or a combination thereof may be used.

In some embodiments, the monomer having a carboxylic acid group may be present in an amount of greater than 0 to less than about 10 wt %, based on a total weight of the monomer mixture or the (meth)acrylic copolymer. In these embodiments, the adhesive film may have improved adhesion and durability, and/or may have reduced surface corrosion of the transparent electrode film. For example, the monomer having a carboxylic acid group may be present in an amount of about 0.1 wt % to about 10 wt %, about 0.1 wt % to about 5 wt %, about 0.1 wt % to about 3 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or about 2.0 wt %, each based on a total weight of the monomer mixture or the (meth)acrylic copolymer.

The (meth)acrylic copolymer may be prepared by including other copolymerizable monomers together with the above described monomers, during polymerization. Non-limiting examples of the other copolymerizable monomers include unsaturated morpholine derivatives, such as vinyl morpholine, acryloylmorpholine, methacryloylmorpholine, and the like; (meth)acrylates having a pyrrolidonyl group; (meth)acrylates having a phosphate group; and the like.

In one embodiment, the (meth)acrylic copolymer may be prepared by introducing an initiator to the monomer mixture, followed by partial polymerization. For example, polymerization may be performed until the (meth)acrylic copolymer has a viscosity of about 1,000 cPs to about 50,000 cPs at 25° C. In these embodiments, the adhesive composition may have improved workability, and thus may be more easily coated onto a surface (e.g., onto a release film). Polymerization (e.g., partial polymerization) may be initiated by UV radiation.

For example, polymerization may be performed by bulk photopolymerization. According to some embodiments, bulk photopolymerization may be suitable for polymerizing the monomer having at least two aromatic groups (such as a phenoxybenzyl group). For example, in bulk photopolymerization, reactivity of the monomers may be increased due to absorption of UV radiation by the aromatic groups, and may thus provide a more uniform and stable adhesive film than may be obtained by a solution polymerization technique. In addition, a copolymer having a weight average molecular weight of greater than about 2,000,000 g/mol may be prepared using bulk polymerization. However, a copolymer having a weight average molecular weight of greater than about 2,000,000 g/mol may be more difficult to prepare using solution polymerization.

The initiator may include any suitable and/or commonly used photopolymerization initiator. When activated by UV irradiation or electron beam treatment, the photopolymerization initiator may generate a free radical suitable for activating a carbon-carbon double bond, producing a carbon free radical.

Non-limiting examples of the initiator include α-hydroxy ketone compounds, benzylketal compounds, acetophenone compounds, and mixtures thereof. Non-limiting examples of the α-hydroxy ketone compounds include 1-hydroxycyclohexyl-phenyl-ketone, 2-hydroxy 2-methyl-1-phenyl-1-propanone,2-hydroxy-1-[4-(2-hydroxyethoxy)phenyl]-2-methyl-1-propanone, and the like. A single initiator may be used or a combination of initiators may be used.

For preparation of the (meth)acrylic copolymer, the initiator may be present in an amount of about 0.001 parts by weight to about 3 parts by weight, for example about 0.003 parts by weight to about 1 part by weight, based on 100 parts by weight of the monomer mixture. Within these ranges, the adhesive film can obtain low light leakage and can exhibit durability and reliability.

The (meth)acrylic copolymer has a glass transition temperature (Tg) of about −50° C. to about −5° C., for example about −31° C. to about −10° C. Within these ranges, the adhesive film can exhibit good workability, durability, and adhesion.

The (meth)acrylic copolymer has a viscosity of about 1,000 cPs to about 50,000 cPs at 25° C., for example about 1,000 cPs to about 15,000 cPs.

The (meth)acrylic copolymer may have a weight average molecular weight of greater than about 2,000,000 g/mol. Within this range, when prepared by curing the adhesive composition, the adhesive film can exhibit good durability and adhesion even after being stored for a long time under high temperature and high moisture conditions. For example, the (meth)acrylic copolymer may have a weight average molecular weight of about 2,100,000 g/mol to about 5,000,000 g/mol, or about 2,100,000 g/mol to about 3,000,000 g/mol.

A process of coating the (meth)acrylic copolymer does not require dissolution of the (meth)acrylic copolymer in a separate solvent. That is, since the (meth)acrylic copolymer can be applied without a solvent, the coating process is simple and easy, and an adhesive film having a thickness from about 10 μm to about 2 mm may be prepared.

The adhesive composition may further include the initiator.

Initiator

The initiator is described above.

For preparation of the (meth)acrylic copolymer, the initiator is present in an amount of about 0.001 parts by weight to about 3 parts by weight, for example about 0.003 parts by weight to about 1 part by weight, based on 100 parts by weight of the monomer mixture. Within these ranges, the adhesive film can obtain low light leakage and can exhibit durability and reliability.

The adhesive composition may further include a cross-linking agent.

Cross-Linking Agent

The cross-linking agent may include a multifunctional (meth)acrylate curable by active energy beams.

Non-limiting examples of the multifunctional (meth)acrylate include: bi-functional (meth)acrylates, such as 1,4-butanedioldi(meth)acrylate, 1,6-hexanedioldi(meth)acrylate, 1,12-dodecanedioldi(meth)acrylate, neopentylglycoldi(meth)acrylate, polyethylene glycoldi(meth)acrylate, neopentylglycoladipatedi(meth)acrylate, dicyclopentanyldi(meth)acrylate, caprolactone-modified dicyclopentenyldi(meth)acrylate, ethylene oxide-modified di(meth)acrylate, bis(meth)acryloxyethylhydroxylisocyanurate, allylatedcyclohexyldi(meth)acrylate, tricyclodecanedimethanol di(meth)acrylate, dimethyloldicyclopentane di(meth)acrylate, ethylene oxide-modified hexahydrophthalic aciddi(meth)acrylate, neopentylglycol-modified trimethylpropanedi(meth)acrylate, adamantanedi(meth)acrylate, 9,9-bis[4-(2-acryloyloxyethoxy)phenyl]fluorene, and the like; tri-functional(meth)acrylates, such as trimethylolpropanetri(meth)acrylate, dipentaerythritoltri(meth)acrylate, propionate-modified dipentaerythritoltri(meth)acrylate, pentaerythritoltri(meth)acrylate, propylene oxide-modified trimethylolpropanetri(meth)acrylate, tri-functional urethane(meth)acrylate, tris(2-(meth)acryloxyethyl) isocyanurate, and the like; tetra-functional(meth)acrylates, such as dig lyceroltetra(meth)acrylate, pentaerythritoltetra(meth)acrylate and the like; penta-functional(meth)acrylates, such as dipentaerythritolpenta(meth)acrylate, and the like; and hexa-functional(meth)acrylates, such as dipentaerythritolhexa(meth)acrylate, caprolactone-modifieddipentaerythritolhexa(meth)acrylate, hexa-functionalurethane(meth)acrylate (e.g., reactants of isocyanate monomers and trimethylolpropanetri(meth)acrylate), and the like. A single crosslinking agent may be used or a combination thereof may be used.

The cross-linking agent may be a multifunctional (meth)acrylate of a multivalent alcohol having about 2 to about 20 hydroxyl groups.

In addition, the cross-linking agent may be an isocyanate, an epoxy, an aziridine, a melamine, an amine, an imide, a carbodiimide, an amide crosslinking agent, or a combination thereof.

For preparation of the (meth)acrylic copolymer, the cross-linking agent is optionally present in an amount of about 5 parts by weight or less, for example about 0.01 parts by weight to about 5 parts by weight, about 0.03 parts by weight to about 3 parts by weight, or about 0.05 parts by weight to about 2 parts by weight, based on 100 parts by weight of the (meth)acrylic copolymer or monomer mixture.

Optionally, the adhesive composition may further include common additives, such as silane coupling agents (e.g., silane compounds), curing accelerators, ionic liquids, lithium salts, inorganic fillers, softening agents, antioxidants, anti-aging agents, stabilizers, adhesion-imparting resins, modified resins (e.g., polyol, phenol, acrylic, polyester, polyolefin, epoxy, epoxidized polybutadiene resins, and the like), leveling agents, antifoaming agents, plasticizers, dyes, pigments (e.g., coloring pigments, extender pigments, and the like), treatment agents, UV protective agents, fluorescence brightening agents, dispersants, heat stabilizers, light stabilizers, UV absorbents, antistatic agents, lubricants, solvents, or the like.

Non-limiting examples of the silane coupling agent include epoxy silane coupling agents.

For preparation of the (meth)acrylic copolymer, the additives (for example, a silane coupling agent) are optionally present in an amount of 5 parts by weight or less, for example about 0.01 parts by weight to about 5 parts by weight, about 0.03 parts by weight to about 3 parts by weight, or about 0.05 parts by weight to about 2 parts by weight, based on 100 parts by weight of the (meth)acrylic copolymer or monomer mixture.

The adhesive composition may have a viscosity of about 1,000 cPs to about 50,000 cPs at 25° C.

The adhesive composition may be used for attachment of an optical film including a polarizing film and a transparent electrode film.

In accordance with another aspect of the present invention, an adhesive composition may include a (meth)acrylic copolymer of a monomer mixture including about 20 wt % or more of a monomer having at least two aromatic groups.

The components of the adhesive composition are described above.

In accordance with a further aspect of the present invention, a method for preparing the adhesive film includes: preparing a (meth)acrylic oligomer by polymerization of a monomer mixture including an alkyl (meth)acrylate having a $C_1$ to $C_{20}$ alkyl group, an alicyclic group-containing (meth)acrylate, a hydroxyl group-containing monomer, and a monomer having at least two aromatic groups; preparing an adhesive composition by mixing the (meth)acrylic oligomer with an initiator; and UV-curing the adhesive composition.

The adhesive composition may further include a cross-linking agent.

The (meth)acrylic oligomer is free of solvents and may have a viscosity of about 1,000 cPs to about 50,000 cPs at 25° C.

Yet another aspect of the present invention relates to a display member.

The display member may include: an optical film; and the adhesive film described herein attached to one or more surfaces (e.g., both surfaces) of the optical film.

Non-limiting examples of the optical film include: transparent electrode films such as touch panels, windows, polarizers, color filters, retardation films, elliptic polarizing films, reflective films, antireflective films, compensation films, brightness enhancing films, alignment layers, light diffusion films, anti-glass scattering films, surface protective films, plastic LCD substrates, indium tin oxide (ITO), fluorinated tin oxide (FTO), aluminum-doped zinc oxide (AZO), carbon nanotubes(CNTs), Ag nanowires, graphene, and the like. The optical film may be easily prepared by those of ordinary skill in the art.

For example, a touch panel may be prepared by attaching a touch pad to a window or an optical film using the adhesive film. Alternatively, the adhesive film may be applied to a common polarizing film as in a common method in the art.

FIG. 1 is a sectional view of a display member according to one embodiment of the present invention. Referring to FIG. 1, a display member 100 includes an optical film 110 and an adhesive film 120 formed on the optical film 110.

Next, the present invention will be explained with reference to some examples. However, it should be understood that these examples are provided for illustration only and are not to be in any way construed as limiting the present invention.

Example 1

A mixture was prepared by mixing 50 parts by weight of ethylhexyl acrylate (EHA), 5 parts by weight of isobornyl acrylate (IBOA), 19 parts by weight of 2-hydroxyethyl acrylate (HEA), 1 part by weight of acrylic acid (AA), 25 parts by weight of phenoxybenzyl acrylate, and 0.04 parts by weight of 2,2-dimethoxy-2-phenylacetophenone (Irgacure™ 651, Ciba Japan K.K. Co., Ltd.) as a photopolymerization initiator in a glass container. After dissolved oxygen was replaced with nitrogen gas, the mixture was partially polymerized by UV irradiation using a low pressure lamp (Sylvania BL Lamp) for several minutes, thereby obtaining a viscous liquid having a viscosity of about 15,000 cPs.

To the prepared composition, 0.1 parts by weight of epoxy silane(KBM-403, Shinetsu Co., Ltd.) as a silane compound, 0.3 parts by weight if an additional polymerization initiator (Irgacure™ 651), and 0.3 parts by weight of 1,6-hexanediol diacrylate (HDDA) were added, thereby preparing an adhesive composition.

The prepared adhesive composition was coated onto a 50 μm thick polyester film (release film), thereby forming an adhesive/release structure having a thickness of 175 μm. In particular, the coated composition was covered with release films on both sides in order to remove oxygen, which adversely affects polymerization. The release films on both sides of the adhesive composition were subjected to UV irradiation for about 6 minutes using a low pressure lamp (Sylvania BL Lamp), thereby obtaining a transparent adhesive film.

Example 2

A transparent adhesive film was prepared as in Example 1 except that 25 parts by weight of 2-phenylphenoxyethyl acrylate was used instead of 25 parts by weight of phenoxybenzyl acrylate.

Example 3

A mixture was prepared by mixing 45 parts by weight of ethylhexyl acrylate (EHA), 10 parts by weight of isobornyl acrylate (IBOA), 20 parts by weight of 2-hydroxyethyl acrylate (HEA), 25 parts by weight of phenoxybenzyl acrylate, and 0.04 parts by weight of 2,2-dimethoxy-2-phenylacetophenone (Irgacure™ 651, Ciba Japan K.K. Co., Ltd.) as a photopolymerization initiator in a glass container. A viscous liquid was obtained using the prepared mixture as in Example 1.

0.3 parts by weight of an additional polymerization initiator (Irgacure™ 651) was added to the prepared composition, thereby preparing an adhesive composition.

A transparent adhesive film was prepared using the prepared adhesive composition as in Example 1.

Example 4

A transparent adhesive film was prepared as in Example 3 except that 25 parts by weight of 2-phenylphenoxyethyl acrylate was used instead of 25 parts by weight of phenoxybenzyl acrylate.

Comparative Example 1

A transparent adhesive film was prepared as in Example 1 except that 25 parts by weight of benzyl acrylate was used instead of 25 parts by weight of phenoxybenzyl acrylate.

Comparative Example 2

A transparent adhesive film was prepared as in Example 1 except that 25 parts by weight of phenoxyethyl acrylate was used instead of 25 parts by weight of phenoxybenzyl acrylate.

Comparative Example 3

A transparent adhesive film was prepared as in Example 3 except that 68 parts by weight of ethylhexyl acrylate (EHA), 7 parts by weight of isobornyl acrylate (IBOA), and 25 parts by weight of 2-hydroxyethyl acrylate (HEA) were used, and phenoxybenzyl acrylate was not used.

Comparative Example 4

After 67 parts by weight of ethylhexyl acrylate (EHA), 7 parts by weight of isobornyl acrylate (IBOA), 25 parts by weight of 2-hydroxyethyl acrylate (HEA), and 1 part by weight of acrylic acid (AA) were uniformly mixed in a glass container, an adhesive composition was prepared by bulk thermal polymerization using azobisisobutyronitrile (AIBN) as a thermal polymerization initiator. After dissolved oxygen was replaced with nitrogen gas, the mixture was partially polymerized by bulk polymerization at 70° C. for several minutes, thereby obtaining a viscous liquid having a viscosity of about 25,000 cPs.

Comparative Example 5

A transparent adhesive film was prepared as in Example 1 except that 56 parts by weight of ethylhexyl acrylate (EHA), 6 parts by weight of isobornyl acrylate (IBOA), 20 parts by weight of 2-hydroxyethyl acrylate (HEA), 1 part by weight of acrylic acid (AA), and 17 parts by weight of phenoxybenzyl acrylate were used.

The prepared adhesive films were evaluated to assess the following properties, and the results are shown in Table 1.

(1) Refractive index: After each adhesive composition was coated onto a PET release film to a thickness of 200 μm and cured at a total luminous intensity of 3,000 mJ/cm² to prepare an adhesive film, the refractive index of the adhesive film was measured using an ABBE5 (Bellingham/Stanley Co., Ltd.) in accordance with ASTM D1218.

(2) Durability: After PC film/ITO film/glass and PET film were attached to each of the prepared adhesive films, the adhesive film was left at 60° C. and 90% relative humidity (RH) for 500 hours, followed by observation of detachment, peeling and bubbling through the naked eye. The adhesive films were rated as follows:

O: Good (neither bubbling nor peeling)
Δ: Not poor (slight bubbling or peeling)
X: Poor (substantial bubbling or peeling)

(3) Average dielectric constant: The dielectric constant was measured for each of the adhesive films (width×length×thickness=4 cm×6 cm×1 mm) at frequencies ranging from $1.0 \times 10^3$ Hz to $1.0 \times 10^6$ Hz using an E5515E (Agilent Co., Ltd.). The average dielectric constant($\overline{X}$) was measured by Equation 1:

$$\overline{x} = \frac{x_1 + x_2 + \ldots + x_{n-1} + x_n}{n} = \frac{1}{n}\sum_{t=1}^{n} x_t, \quad \text{Equation 1}$$

In Equation 1, $X_1$ is the dielectric constant at a first frequency; $X_2$ is the dielectric constant at a second frequency; $X_{n-1}$ is the dielectric constant at an n−1th frequency; $X_n$ is the dielectric constant at an nth frequency; n is an integer from 2 to 100; and n−1th frequency <$n^{th}$ frequency.

TABLE 1

| | | Ex. 1 | Ex. 2 | Ex. 3 | Ex. 4 | Comp. Ex. | Comp. Ex. 2 | Comp. Ex. 3 | Comp. Ex. 4 | Comp. Ex. 5 |
|---|---|---|---|---|---|---|---|---|---|---|
| Acrylic copolymer | EHA | 50 | 50 | 45 | 45 | 50 | 50 | 68 | 67 | 56 |
| | IBOA | 5 | 5 | 10 | 10 | 5 | 5 | 7 | 7 | 6 |
| | HEA | 19 | 19 | 20 | 20 | 19 | 19 | 25 | 25 | 20 |
| | AA | 1 | 1 | — | — | 1 | 1 | — | 1 | 1 |
| | phenoxy-benzyl acrylate | 25 | — | 25 | — | — | — | — | — | 17 |
| | 2-phenyl-phenoxyethyl acrylate | — | 25 | — | 25 | — | — | — | — | — |
| | benzyl acrylate | — | — | — | — | 25 | — | — | — | — |
| | phenoxyethyl acrylate | — | — | — | — | — | 25 | — | — | — |
| | initiator | 0.3 | 0.3 | 0.3 | 0.3 | 0.3 | 0.3 | 0.3 | 0.3 | 0.3 |
| | cross-linking agent | 0.3 | 0.3 | — | — | 0.3 | 0.3 | 0.3 | 0.3 | 0.3 |
| | epoxy silane | 0.1 | 0.1 | — | — | 0.1 | 0.1 | — | — | 0.1 |
| | preparation method | UV curing | UV curing | UV curing | UV curing | UV curing | UV curing | UV curing | thermal curing | UV curing |
| | weight average molecular weight of copolymer (g/mol) | 3 million | 2.6 million | 3 million | 2.5 million | 2.5 million | 2 million | 4 million | 0.5 million | 3 million |
| | glass transition temperature of copolymer (° C.) | −31 | −22 | −28 | −18 | −28 | −30 | −41 | −38 | −34 |
| | viscosity of copolymer at 25° C. (cPs) | 15,000 | 2,500 | 13,000 | 2,300 | 14,000 | 15,000 | 3,000 | 25,000 | 13,000 |
| | refractive index | 1.51 | 1.53 | 1.51 | 1.53 | 1.49 | 1.48 | 1.47 | 1.47 | 1.48 |
| | durability | O | O | O | O | X | O | X | X | O |
| | average dielectric constant | 2.9 | 2.9 | 2.8 | 2.9 | 3.0 | 3.0 | 4.1 | 4.3 | 3.4 |

As shown in Table 1, the adhesive films according to embodiments of the present invention (i.e., Examples 1 to 4) had high pattern concealment due to their high indices of refraction. Additionally, the adhesive films according to embodiments of the present invention had good durability and low dielectric constants.

On the other hand, as the adhesive films of Comparative Examples 1 and 2 included the (meth)acrylic copolymer prepared from the monomer mixture including a monomer having one aromatic group, these adhesive films had lower indices of refraction than the adhesive films according to embodiments of the present invention (i.e., Examples 1 to 4). As a result, the adhesive films of Comparative Examples 1 and 2 had low pattern concealment and high dielectric constants.

Additionally, as the adhesive films of Comparative Examples 3 and 4 included the (meth)acrylic copolymer prepared from the monomer mixture free of monomers having an aromatic group, these adhesive films had lower refractive indices than the adhesive films according to embodiments of the present invention (i.e., Examples 1 to 4), even when using different curing methods. As a result, the adhesive films of Comparative Examples 3 and 4 had low pattern concealment, poor durability, and high dielectric constants.

Further, as the adhesive film of Comparative Example 5 included the (meth)acrylic copolymer prepared from a monomer mixture including less than 20 wt % of a monomer having at least two aromatic groups, this adhesive film had a lower refractive index than the adhesive films according to embodiments of the present invention (i.e., Examples 1 to 4). As a result, the adhesive film of Comparative Example 5 exhibited low pattern concealment, and had a high dielectric constant.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An adhesive film, comprising a cured reaction product of an adhesive composition, the adhesive composition comprising a (meth)acrylic copolymer of a monomer mixture, and the adhesive film having a refractive index of about 1.5 to about 1.6, wherein the (meth)acrylic copolymer has a glass transition temperature (Tg) of about $-50°$ C. to about $-5°$ C., wherein the adhesive film has an average dielectric constant of less than 3, wherein the monomer mixture comprises one or more monomers having at least two aromatic groups, one or more (meth)acrylate monomers having a $C_1$ to $C_{20}$ alkyl group, one or more (meth)acrylate monomers having an alicyclic group, and one or more monomers having a hydroxy group, wherein the one or more monomers having at least two aromatic groups comprises at least one of phenoxybenzyl (meth)acrylate and phenylphenoxyethyl (meth)acrylate

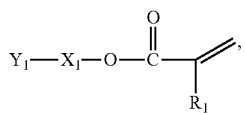

and wherein the monomer mixture comprises a total amount of about 10 wt % to about 50 wt % of the one or more (meth)acrylate monomers having a $C_1$ to $C_{20}$ alkyl group, a total amount of about 1 wt % to about 8 wt % of the one or more (meth)acrylate monomers having an alicyclic group, a total amount of about 15 wt % to about 30 wt % of the one or more monomers having a hydroxy group, and a total amount of about 20 wt % to about 50 wt % of the one or more monomers having at least two aromatic groups, each based on a total weight of the monomer mixture.

2. The adhesive film according to claim 1, wherein the one or more monomers having at least two aromatic groups further comprises at least one selected from the group consisting of a fluorene-based monomer, a naphthalene-based monomer, a urethane-based monomer having at least two aromatic groups, and a sulfur-based monomer having at least two aromatic groups.

3. The adhesive film according to claim 1, wherein the (meth)acrylic copolymer comprises about 10 wt % or more of a group represented by Formula 1, based on the total weight of the (meth)acrylic copolymer:

[Formula 1]

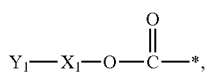

wherein $Y_1$ is a $C_6$ to $C_{20}$ aryl group substituted with at least one of a substituted or unsubstituted phenoxy group, a substituted or unsubstituted $C_6$ to $C_{20}$ aryl group, or a substituted or unsubstituted $C_7$ to $C_{21}$ arylalkyl group;

$X_1$ is a divalent substituted or unsubstituted $C_1$ to $C_{10}$ aliphatic hydrocarbon group; or a divalent substituted or unsubstituted group represented by $-R-(CH_2)_n-$, wherein n is an integer of 1 to 10, R is O, S, NH, or NR', and R' is a $C_1$ to $C_5$ alkyl group; and

* is a binding site to a polymer backbone of the (meth)acrylic copolymer.

4. The adhesive film according to claim 1, wherein the (meth)acrylic copolymer has a viscosity of about 1,000 cPs to about 50,000 cPs at 25° C.

5. The adhesive film according to claim 1, wherein the (meth)acrylic copolymer has a weight average molecular weight of greater than about 2,000,000 g/mol.

6. The adhesive film according to claim 1, wherein the adhesive composition comprises the (meth)acrylic copolymer; an initiator; and a cross-linking agent.

7. The adhesive film according to claim 6, wherein the composition further comprises an epoxy silane coupling agent.

8. The adhesive film according to claim 1, wherein the adhesive film has a thickness of about 10 μm to about 2 mm.

9. An adhesive composition comprising a (meth)acrylic copolymer of a monomer mixture, the monomer mixture comprising a total amount of about 10 wt % to about 50 wt % of one or more (meth)acrylate monomers having a $C_1$ to $C_{20}$ alkyl group, a total amount of about 15 wt % to about 30 wt % of one or more monomers having a hydroxy group, a total amount of about 20 wt % to about 50 wt % of one or more monomers having at least two aromatic groups, and a total amount of about 1 wt % to about 8 wt % of one or more (meth)acrylate monomers having an alicyclic group, each based on a total weight of the monomer mixture, wherein the (meth)acrylic copolymer has a glass transition temperature (Tg) of about $-50°$ C. to about $-5°$ C., wherein an adhesive film formed from the adhesive composition has an average dielectric constant of less than 3, wherein the one or more monomers having at least two aromatic groups comprises at least one of phenoxybenzyl (meth)acrylate and phenylphenoxyethyl (meth)acrylate

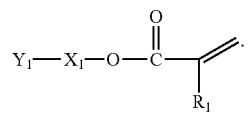

10. The adhesive composition according to claim 9, wherein the one or more monomers having at least two aromatic groups further comprises at least one selected from the group consisting of a fluorene-based monomer, a naphthalene-based monomer, a urethane-based monomer having at least two aromatic groups, and a sulfur-based monomer having at least two aromatic groups.

11. The adhesive composition according to claim 9, further comprising a cross-linking agent and an epoxy silane coupling agent.

12. A display member comprising:
an optical film; and
the adhesive film according to claim 1 on one or more surfaces of the optical film.

13. The display member according to claim 12, wherein the optical film is a polarizing film.

14. The display member according to claim 12, wherein the optical film comprises a film on which at least one of indium tin oxide (ITO), fluorinated tin oxide (FTO), aluminum doped zinc oxide (AZO), carbon nanotubes (CNTs), Ag nanowires, or graphene, is stacked.

* * * * *